United States Patent [19]
Falkenstein

[11] 3,763,584
[45] Oct. 9, 1973

[54] ADVERTISING DISPLAY DEVICE

[76] Inventor: Albert J. Falkenstein, 3704 Summit Rd., Barberton, Ohio

[22] Filed: June 8, 1972

[21] Appl. No.: 261,084

[52] U.S. Cl. ............................................. 40/125 M
[51] Int. Cl. ............................................. G09f 1/00
[58] Field of Search ............... 40/125 M, 129 B, 40/20 A, 10

[56] References Cited
UNITED STATES PATENTS

| | | | |
|---|---|---|---|
| 1,506,356 | 8/1924 | Bott | 40/20 A |
| 2,503,988 | 4/1950 | Arbib | 40/125 M |
| 2,860,436 | 11/1958 | Silver | 40/129 B |
| 3,481,652 | 12/1969 | Mazerolle | 40/129 B |

Primary Examiner—Robert W. Michell
Assistant Examiner—Wenceslao J. Contreras
Attorney—Freeman & Taylor

[57] ABSTRACT

A one piece advertising display device for use in connection with pneumatic tires, and particularly a device intended to be inserted and locked in place in the bead area of the tire. The device includes a central body portion with a circumferential annular flange projecting from the rear of the body and being of a sufficient depth to engage the bead portion of a tire and hold the device in place without the requirement of any additional components.

1 Claim, 3 Drawing Figures

PATENTED OCT 9 1973　　　　　　　　　　　　　　3,763,584

ADVERTISING DISPLAY DEVICE

BACKGROUND OF THE INVENTION

This invention relates, in general, to an advertising display device and, in particular, to a device utilized in connection with the display of pneumatic tires in retail outlets.

DESCRIPTION OF THE PRIOR ART

The following prior art is known to Applicant:

| Kistler | U.S. Patent 1,843,031 |
| Harrington | U.S. Patent 1,943,237 |
| Kistler | U.S. Patent 1,946,861 |
| Riley | U.S. Patent 2,177,947 |
| Knapp | U.S. Patent 2,737,743 |
| Silver | U.S. Patent 2,860,436 |
| Walklet | U.S. Design Patent 216,241 |
| Walklet | U.S. Design Patent 216,243 |
| Walklet | U.S. Design Patent 216,244 |

While the various display devices illustrated and described in the above-noted patents appear to be capable of performing the function for which they are designed, they all have certain practical disadvantages in that they are not a one-piece self-contained unit. All of them require the utilization of various clips, rings, fasteners, etc., in order to secure them in place in the tire.

The disadvantage of structures such as these from a practical standpoint are that, being composed of several elements, some of these elements, such as the clips or retainers, tend to become lost during use, with the result that the important part of the combination, namely, the disc which bears the advertising material, is not utilized, thereby defeating the purpose of the entire project.

Applicant has provided a one-piece disc which will lock itself into place, thereby eliminating the problems encountered in the prior art.

SUMMARY OF THE INVENTION

In order to overcome the disadvantages of the known prior art illustrated above, Applicant has found that a one-piece disc can be provided having one face or surface capable of bearing an advertising imprint, while a circumferential or annular flange projects from the opposed surface of the disc.

It has been found that if this flange is designed to have a certain depth, it will have sufficient depth to engage substantially all of the width of the bead of the tire and will, therefore, retain its position in the tire without the need for the utilization of any auxiliary components.

It has also been found that if the inside wall of the flange is tapered from its point of juncture with the main body portion toward the remaining wall, this configuration will serve to frictionally and resiliently press the flange against the bead to assist in holding the disc in place.

It has also been found that a peripheral edge can be provided about the periphery of the body and separated therefrom by the flange to cover the outside surface of the bead area for improved aesthetic purposes.

Accordingly, production of an improved advertising display device having the above characteristics becomes the principal object of this invention, with other objects thereof becoming more apparent upon a reading of the following brief specification considered and interpreted in view of the accompanying drawings.

OF THE DRAWINGS

BRIEF DESCRIPTION OF THE PREFERRED EMBODIMENT

Figures 2, 3:
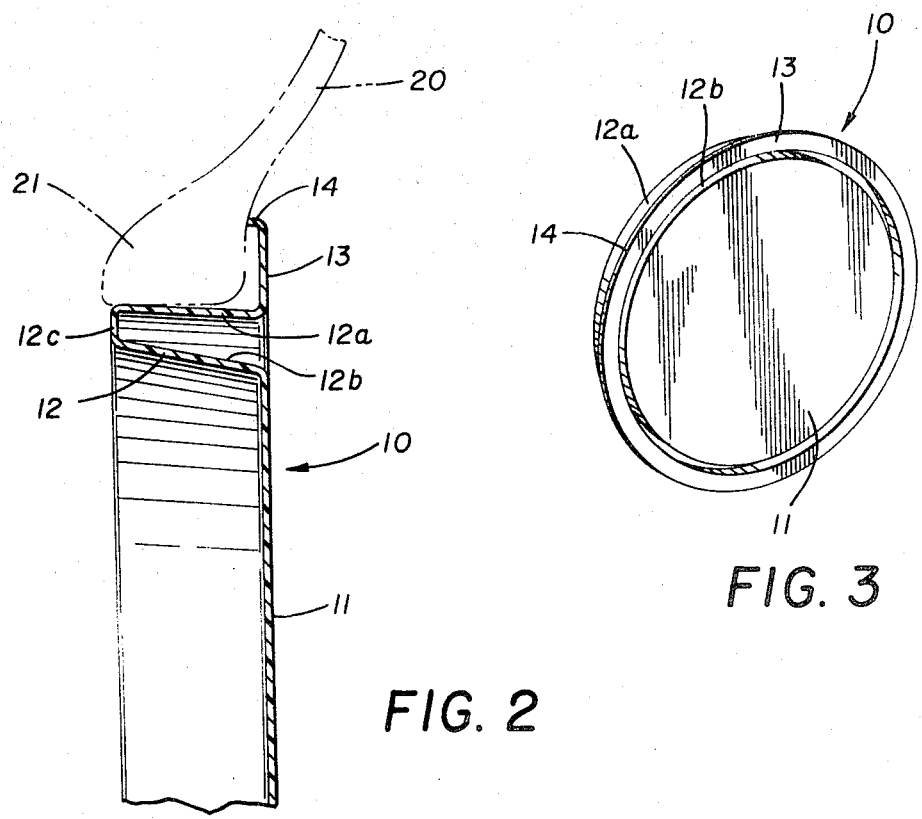
FIG. 2 is a sectional view taken along the lines 2—2 of FIG. 1, showing the engagement of the flange with the tire bead.
FIG. 3 is a perspective view of the improved display device per se.

Referring to FIGS. 2 and 3, it will be noted that the disc, generally indicated by the numeral 10, has a main body portion 11 which may be made of any desirable material, such as lightweight, low cost plastic for example. It should be understood, however, that the invention is not intended to be limited to any particular material.

Integral with and projecting from the rear surface of the body 11 is a flange 12, which includes opposed side walls 12a and 12b which are joined at their ends by a bottom wall 12c.

While the invention is not intended to be limited to any specific dimensions, the depth of the flange 12 will be sufficient to engage a substantial portion of the inner surface of the bead of the tire, as is clearly illustrated in FIG. 2.

Figure 1:
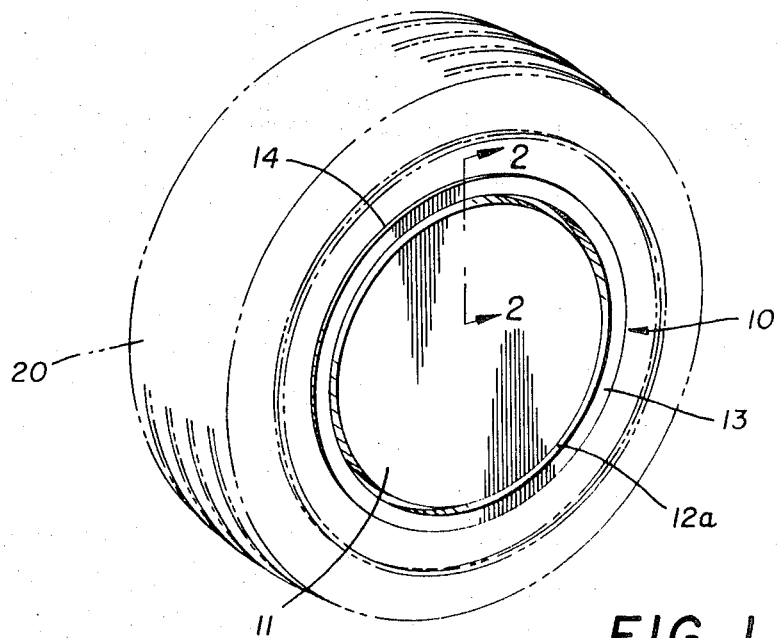
FIG. 1 is a perspective view of the advertising display device showing the same in position on a tire.

It will be noted that the wall 12a projects substantially perpendicularly from the body portion 11, while the opposed wall 12b is inclined so that it is spaced from wall 12a the greatest distance at its point of juncture with the body 11 and is disposed at its least distance adjacent the end wall 12c. As noted above, the device is intended to be constructed of some lightweight flexible material, and once the device is snapped into place, as clearly shown in FIGS. 1 and 2, the sloping of the wall 12b will tend to resist further deformation and will assist in retaining the device 10 within the bead 21 of the tire 20.

Extending from the end of the wall 12a of flange 12 to the periphery of the disc is a peripheral edge portion 13 which has an inturned flange 14 on its outboard or peripheral edge. When the device is in place in the tire, this peripheral edge 13 will thus cover a portion of the bead.

In operation of the device, it will be assumed that appropriate advertising or promotional material will have been placed on the outer face of body 11 in conventional fashion. At that point it is simply necessary to snap the flange 12 into place in the center of the tire 20, with the flange engaging the bead 21, as clearly shown in the drawings, and holding the disc 10 in place without the utilization of any additional components.

In this fashion the principal object which is to provide advertising material directly associated with tires in retail outlets, will be achieved with a simple but effective one-piece device.

As noted above, the invention is not intended to be limited to any particular size or material, although it is believed apparent that depending upon the size tire, a different diameter device would be required because of the difference in the bead-to-bead diameter of various sized tires.

Similarly with regard to material, the material employed must have a certain degree of flexibility to enable it to be snapped into place as described above.

While a full and complete description of the invention has been set forth in accordance with the dictates of the Patent Statutes, it should be understood that modifications can be resorted to without departing from the spirit hereof or the scope of the appended claims.

What is claimed is:

1. A self-locating display disc for attachment to the bead of a pneumatic tire, comprising;
   A. a central body portion; and
   B. an integral, circumferential, bead-engaging flange
      1. projecting from one face of said body portion and
      2. spaced inwardly from the peripheral edge of said body;
   C. said flange including
      1. first and second spaced apart walls,
      2. said first wall projecting substantially perpendicularly with respect to the plane of said body, and
      3. said second wall being inclined toward said first wall from its point of juncture with said body.

* * * * *